United States Patent
Seo et al.

(10) Patent No.: US 9,807,786 B2
(45) Date of Patent: Oct. 31, 2017

(54) METHOD AND APPARATUS FOR TRANSMITTING SIGNAL OF DEVICE TO DEVICE USER EQUIPMENT IN WIRELESS COMMUNICATION SYSTEM

(71) Applicant: LG ELECTRONICS INC., Seoul (KR)

(72) Inventors: Inkwon Seo, Seoul (KR); Hakseong Kim, Seoul (KR); Hanbyul Seo, Seoul (KR); Seungmin Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 55 days.

(21) Appl. No.: 14/917,541

(22) PCT Filed: Sep. 11, 2014

(86) PCT No.: PCT/KR2014/008467
§ 371 (c)(1),
(2) Date: Mar. 8, 2016

(87) PCT Pub. No.: WO2015/037913
PCT Pub. Date: Mar. 19, 2015

(65) Prior Publication Data
US 2016/0219612 A1    Jul. 28, 2016

Related U.S. Application Data

(60) Provisional application No. 61/876,750, filed on Sep. 11, 2013.

(51) Int. Cl.
*H04W 72/12* (2009.01)
*H04L 1/00* (2006.01)
(Continued)

(52) U.S. Cl.
CPC ....... *H04W 72/1263* (2013.01); *H04L 1/0007* (2013.01); *H04L 1/0041* (2013.01);
(Continued)

(58) Field of Classification Search
CPC . H04L 1/0007; H04L 1/0067; H04L 12/2854; H04L 69/22; H04L 1/0041; H04L 5/0053; H04W 72/1263; H04W 72/1215
See application file for complete search history.

(56) References Cited

U.S. PATENT DOCUMENTS 6,285,681 B1 *  9/2001  Kolze ............... H04L 1/0002
                                                370/395.5
2005/0135284 A1 *  6/2005  Nanda ............ H04L 29/06068
                                                370/294
(Continued)

FOREIGN PATENT DOCUMENTS

KR    10-2012-0073147 A    7/2012
WO    WO 2013/109100 A1    7/2013

OTHER PUBLICATIONS

Ericsson et al., "On data channel design," 3GPP TSG-RAN WG1 Meeting #74, R1-133633, Barcelona, Spain, Aug. 19-23, 2013, 4 pgs.

*Primary Examiner* — Asad Nawaz
*Assistant Examiner* — Syed S Ali
(74) *Attorney, Agent, or Firm* — Birch, Stewart, Kolasch & Birch, LLP (57) ABSTRACT

An embodiment of the present invention provides a method for transmitting a device to device (D2D) signal by a user equipment (UE) in a wireless communication system. The method comprises: generating a K bit codeword from N bit information; allocating the K bit codeword to a first block and a second block; performing interleaving in each of the first block and the second block; mapping the interleaved codewords of the first block and the second block to a plurality of symbols of a subframe and transmitting the codewords mapped to the symbols, wherein the size of the second block is determined according to the number of symbols related to a guard interval among the plurality of symbols.

12 Claims, 8 Drawing Sheets

(51) Int. Cl.
  *H04L 5/00* (2006.01)
  *H04L 12/28* (2006.01)
  *H04L 29/06* (2006.01)

(52) U.S. Cl.
  CPC .......... *H04L 1/0067* (2013.01); *H04L 5/0053* (2013.01); *H04L 12/2854* (2013.01); *H04L 69/22* (2013.01); *H04W 72/1215* (2013.01)

(56) References Cited

U.S. PATENT DOCUMENTS

| | | | |
|---|---|---|---|
| 2005/0135295 A1* | 6/2005 | Walton | H04W 74/0816 370/328 |
| 2006/0165189 A1* | 7/2006 | Tamaki | H04L 1/0003 375/260 |
| 2006/0218459 A1* | 9/2006 | Hedberg | H03M 13/1102 714/752 |
| 2008/0008231 A1* | 1/2008 | Wang | H04L 1/0026 375/219 |
| 2008/0168332 A1* | 7/2008 | Palanki | H04L 1/0007 714/776 |
| 2008/0301536 A1 | 12/2008 | Shin et al. | |
| 2013/0136028 A1 | 5/2013 | Gan et al. | |
| 2014/0185530 A1* | 7/2014 | Kuchibhotla | H04W 76/023 370/329 |
| 2014/0334392 A1* | 11/2014 | Gage | H04L 5/0092 370/329 |
| 2014/0342747 A1 | 11/2014 | Lee et al. | |
| 2015/0117337 A1* | 4/2015 | Choi | H04L 1/1657 370/329 |
| 2015/0195069 A1* | 7/2015 | Yi | H04L 5/0053 370/329 |
| 2016/0119083 A1* | 4/2016 | Zhao | H04L 1/0068 375/267 |

\* cited by examiner

METHOD AND APPARATUS FOR TRANSMITTING SIGNAL OF DEVICE TO DEVICE USER EQUIPMENT IN WIRELESS COMMUNICATION SYSTEM

CROSS REFERENCE TO RELATED APPLICATIONS

This application is the National Phase of PCT/KR2014/008467 filed on Sep. 11, 2014, which claims priority under 35 U.S.C. 119(e) to U.S. Provisional Application No. 61/876,750 filed on Sep. 11, 2013, all of which are hereby expressly incorporated by reference into the present application.

TECHNICAL FIELD

Following description relates to a wireless communication, and more particularly, to a method of receiving device-to-device (D2D) signal in device-to-device communication and an apparatus therefor.

BACKGROUND ART

Wireless communication systems are widely deployed to provide various kinds of communication content such as voice and data. Generally, these communication systems are multiple access systems capable of supporting communication with multiple users by sharing available system resources (e.g., bandwidth and transmit power). Examples of multiple access systems include a code division multiple access (CDMA) system, a frequency division multiple access (FDMA) system, a time division multiple access (TDMA) system, an orthogonal frequency division multiple access (OFDMA) system, a single carrier frequency-division multiple access (SC-FDMA) system, and a multi-carrier frequency division multiple access (MC-FDMA) system.

A device-to-device (hereinafter abbreviated D2D) communication corresponds to a communication scheme transmitting and receiving audio, data and the like between UEs without passing through an evolved Node B (hereinafter abbreviated eNB) by configuring a direct link between the UEs. The D2D communication can include such a communication scheme as a UE-to-UE communication scheme, a peer-to-peer communication scheme and the like. The D2D communication scheme can be applied to a M2M (machine-to-machine) communication, MTC (machine type communication) and the like.

The D2D communication is considered as a method of solving a burden of an eNB resulted from increasing data traffic. For instance, unlike a legacy wireless communication system, the D2D communication transmits and receives data between devices without passing through an eNB. Hence, the D2D communication can reduce network overload. Moreover, if the D2D communication is introduced, it may be able to expect reduced procedures of an eNB, reduced power consumption of devices participating in the D2D, increased data transmission speed, increased network capacity, load distribution, and enlarged a cell coverage and the like.

DISCLOSURE OF THE INVENTION

Technical Task

The technical task of the present invention is to provide a method of transmitting a signal in a subframe including a guard period in device-to-device communication.

Technical tasks obtainable from the present invention are non-limited the above-mentioned technical task. And, other unmentioned technical tasks can be clearly understood from the following description by those having ordinary skill in the technical field to which the present invention pertains.

Technical Solutions

In a $1^{St}$ technical aspect of the present invention, provided herein is a method of transmitting a D2D (device-to-device) signal by a user equipment in a wireless communication system, including the steps of generating K bits of a codeword from N bits of information, allocating the K bits of the codeword to a block and a $2^{nd}$ block, performing interleaving on each of the $1^{st}$ block and the $2^{nd}$ block, mapping codewords of the $1^{st}$ block and the $2^{nd}$ block on which the interleaving is performed to a plurality of symbols in a subframe, and transmitting the mapped codewords, wherein a size of the $2^{nd}$ block is determined according to the number of symbols related to a guard period among the plurality of the symbols.

In a $2^{nd}$ technical aspect of the present invention, provided herein is a user equipment for transmitting a D2D (device-to-device) signal in a wireless communication system, including a transmit module and a processor, wherein the processor is configured to generate K bits of a codeword from N bits of information, to allocate the K bits of the codeword to a $1^{st}$ block and a $2^{nd}$ block, to perform interleaving on each of the $1^{st}$ block and the $2^{nd}$ block, to map codewords of the $1^{st}$ block and the $2^{nd}$ block on which the interleaving is performed to a plurality of symbols in a subframe, and to control the transmit module to transmit the mapped codewords and wherein a size of the $2^{nd}$ block is determined according to the number of symbols related to a guard period among the plurality of the symbols.

Some/all of the following matters may be included in the $1^{st}$ and $2^{nd}$ technical aspects of the present invention.

The $2^{nd}$ block includes only parity bits among the K bits.

Mapping of a codeword allocated to the $1^{st}$ block to the symbols related to the guard period is prohibited.

A size of the $1^{st}$ block is greater than systematic bits among the K bits.

The size of the $2^{nd}$ block is $$K \times \frac{N_{symb}^{GP}}{2N_{symb}},$$

where K is a bit number of the codeword, $N_{symb}^{GP}$ is the number of the symbols related to the guard period, and $N_{symb}$ is the number of symbols in each slot.

The guard period relates to switching between WAN (wide area network) communication and D2D communication.

The guard period relates to sounding reference signal transmission from a user equipment adjacent to the user equipment.

Advantageous Effects

According to the present invention, decoding performance degradation that may be caused by a guard period in D2D communication can be avoided.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

BEST MODE FOR INVENTION

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

In the embodiments of the present invention, a description is made, centering on a data transmission and reception relationship between a Base Station (BS) and a User Equipment (UE). The BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', 'Access Point (AP)', etc. The term 'relay' may be replaced with the term 'Relay Node (RN)' or 'Relay Station (RS)'. The term 'terminal' may be replaced with the term 'UE', 'Mobile Station (MS)', 'Mobile Subscriber Station (MSS)', 'Subscriber Station (SS)', etc.

Specific terms used for the embodiments of the present invention are provided to help the understanding of the present invention. These specific terms may be replaced with other terms within the scope and spirit of the present invention.

In some cases, to prevent the concept of the present invention from being ambiguous, structures and apparatuses of the known art will be omitted, or will be shown in the form of a block diagram based on main functions of each structure and apparatus. Also, wherever possible, the same reference numbers will be used throughout the drawings and the specification to refer to the same or like parts.

The embodiments of the present invention can be supported by standard documents disclosed for at least one of wireless access systems, Institute of Electrical and Electronics Engineers (IEEE) 802, 3rd Generation Partnership Project (3GPP), 3GPP Long Term Evolution (3GPP LTE), LTE-Advanced (LTE-A), and 3GPP2. Steps or parts that are not described to clarify the technical features of the present invention can be supported by those documents. Further, all terms as set forth herein can be explained by the standard documents.

Techniques described herein can be used in various wireless access systems such as Code Division Multiple Access (CDMA), Frequency Division Multiple Access (FDMA), Time Division Multiple Access (TDMA), Orthogonal Frequency Division Multiple Access (OFDMA), Single Carrier-Frequency Division Multiple Access (SC-FDMA), etc. CDMA may be implemented as a radio technology such as Universal Terrestrial Radio Access (UTRA) or CDMA2000. TDMA may be implemented as a radio technology such as Global System for Mobile communications (GSM)/General Packet Radio Service (GPRS)/Enhanced Data Rates for GSM Evolution (EDGE). OFDMA may be implemented as a radio technology such as IEEE 802.11 (Wi-Fi), IEEE 802.16 (WiMAX), IEEE 802.20, Evolved-UTRA (E-UTRA) etc. UTRA is a part of Universal Mobile Telecommunications System (UMTS). 3GPP LTE is a part of Evolved UMTS (E-UMTS) using E-UTRA. 3GPP LTE employs OFDMA for downlink and SC-FDMA for uplink. LTE-A is an evolution of 3GPP LTE. WiMAX can be described by the IEEE 802.16e standard (Wireless Metropolitan Area Network (WirelessMAN)-OFDMA Reference System) and the IEEE 802.16m standard (WirelessMAN-OFDMA Advanced System). For clarity, this application focuses on the 3GPP LTE and LTE-A systems. However, the technical features of the present invention are not limited thereto.

LTE/LTE-A Resource Structure/Channel

Figure 1:
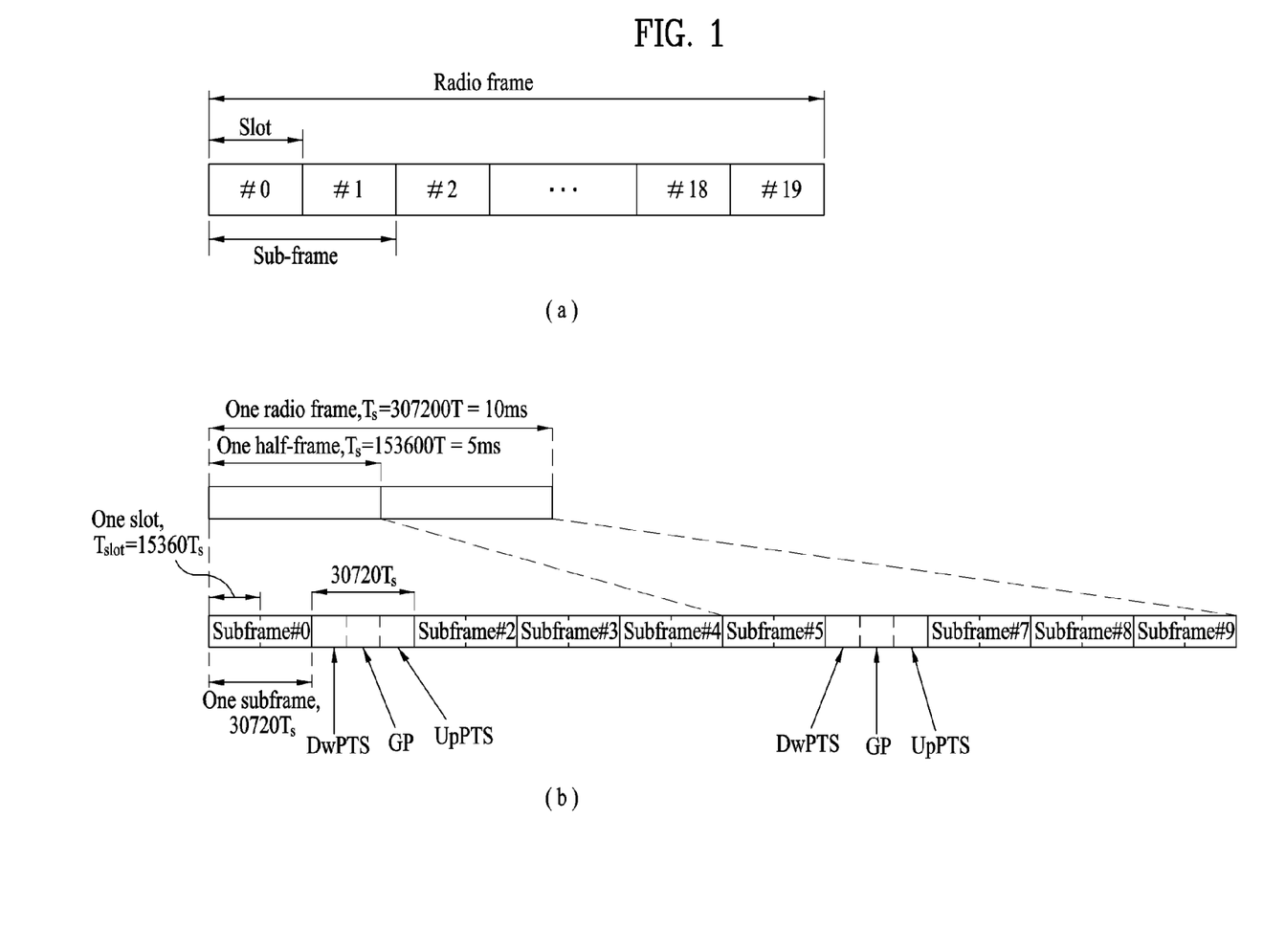
FIG. 1 is a diagram for a structure of a radio frame.

With reference to FIG. 1, the structure of a radio frame will be described below.

In a cellular Orthogonal Frequency Division Multiplexing (OFDM) wireless packet communication system, uplink and/or downlink data packets are transmitted in subframes. One subframe is defined as a predetermined time period including a plurality of OFDM symbols. The 3GPP LIE standard supports a type-1 radio frame structure applicable to Frequency Division Duplex (FDD) and a type-2 radio frame structure applicable to Time Division Duplex (TDD).

FIG. 1(a) illustrates the type-1 radio frame structure. A downlink radio frame is divided into 10 subframes. Each subframe is further divided into two slots in the time domain. A unit time during which one subframe is transmitted is defined as a Transmission Time Interval (TTI). For example, one subframe may be 1 ms in duration and one slot may be 0.5 ms in duration. A slot includes a plurality of OFDM symbols in the time domain and a plurality of Resource Blocks (RBs) in the frequency domain. Because the 3GPP LTE system adopts OFDMA for downlink, an OFDM symbol represents one symbol period. An OFDM symbol may be referred to as an SC-FDMA symbol or symbol period. An RB is a resource allocation unit including a plurality of contiguous subcarriers in a slot.

The number of OFDM symbols in one slot may vary depending on a Cyclic Prefix (CP) configuration. There are two types of CPs: extended CP and normal CP. In the case of the normal CP, one slot includes 7 OFDM symbols. In the case of the extended CP, the length of one OFDM symbol is increased and thus the number of OFDM symbols in a slot is smaller than in the case of the normal CP. Thus when the extended CP is used, for example, 6 OFDM symbols may be included in one slot. If channel state gets poor, for example, during fast movement of a UE, the extended CP may be used to further decrease Inter-Symbol Interference (ISI).

In the case of the normal CP, one subframe includes 14 OFDM symbols because one slot includes 7 OFDM symbols. The first two or three OFDM symbols of each subframe may be allocated to a Physical Downlink Control CHannel (PDCCH) and the other OFDM symbols may be allocated to a Physical Downlink Shared Channel (PDSCH).

FIG. 1(b) illustrates the type-2 radio frame structure. A type-2 radio frame includes two half frames, each having 5 subframes, a Downlink Pilot Time Slot (DwPTS), a Guard Period (GP), and an Uplink Pilot Time Slot (UpPTS). Each subframe is divided into two slots. The DwPTS is used for initial cell search, synchronization, or channel estimation at a UE. The UpPTS is used for channel estimation and acquisition of uplink transmission synchronization to a UE at an eNB. The GP is a period between an uplink and a downlink, which eliminates uplink interference caused by multipath delay of a downlink signal. One subframe includes two slots irrespective of the type of a radio frame.

The above-described radio frame structures are purely exemplary and thus it is to be noted that the number of subframes in a radio frame, the number of slots in a subframe, or the number of symbols in a slot may vary.

Figure 2:
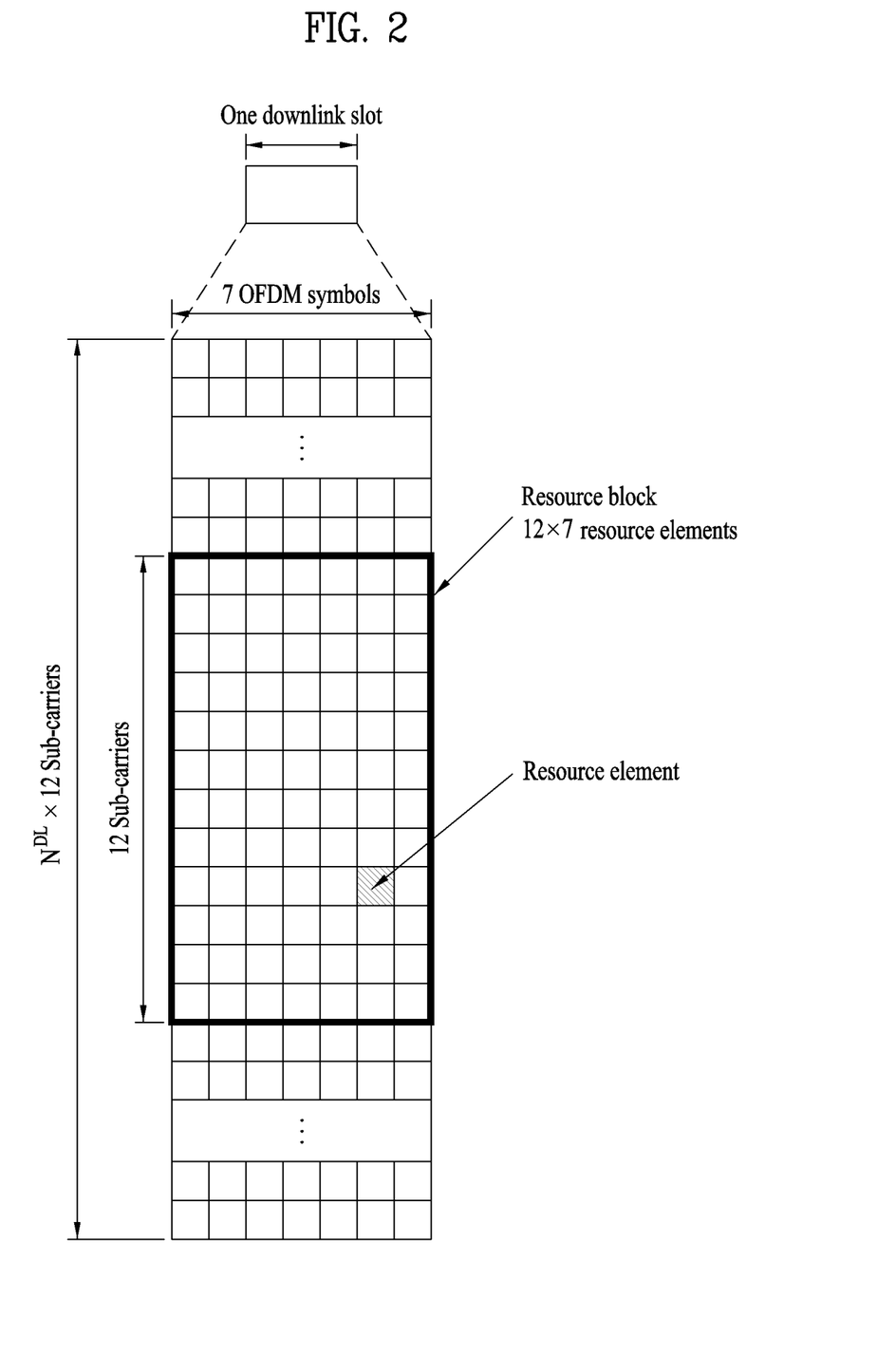
FIG. 2 is a diagram for a resource grid in downlink slot.

FIG. 2 illustrates the structure of a downlink resource grid for the duration of one downlink slot. A downlink slot includes 7 OFDM symbols in the time domain and an RB includes 12 subcarriers in the frequency domain, which does not limit the scope and spirit of the present invention. For example, a downlink slot may include 7 OFDM symbols in the case of the normal CP, whereas a downlink slot may include 6 OFDM symbols in the case of the extended CP. Each element of the resource grid is referred to as a Resource Element (RE). An RB includes 12×7 REs. The number of RBs in a downlink slot, NDL depends on a downlink transmission bandwidth. An uplink slot may have the same structure as a downlink slot.

Figure 3:
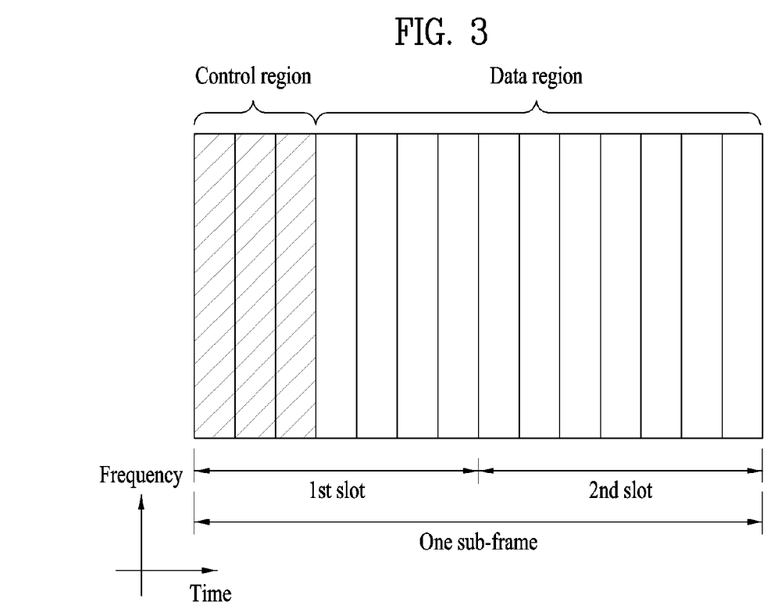
FIG. 3 is a diagram for a structure of a downlink subframe.

FIG. 3 illustrates the structure of a downlink subframe. Up to three OFDM symbols at the start of the first slot in a downlink subframe are used for a control region to which control channels are allocated and the other OFDM symbols of the downlink subframe are used for a data region to which a PDSCH is allocated. Downlink control channels used in the 3GPP LTE system include a Physical Control Format Indicator CHannel (PCFICH), a Physical Downlink Control CHannel (PDCCH), and a Physical Hybrid automatic repeat request (HARQ) Indicator CHannel (PHICH). The PCFICH is located in the first OFDM symbol of a subframe, carrying information about the number of OFDM symbols used for transmission of control channels in the subframe. The PHICH delivers an HARQ ACKnowledgment/Negative ACKnowledgment (ACK/NACK) signal in response to an uplink transmission. Control information carried on the PDCCH is called Downlink Control Information (DCI). The DCI transports uplink or downlink scheduling information, or uplink transmission power control commands for UE groups. The PDCCH delivers information about resource allocation and a transport format for a Downlink Shared CHannel (DL-SCH), resource allocation information about an Uplink Shared CHannel (UL-SCH), paging information of a Paging CHannel (PCH), system information on the DL-SCH, information about resource allocation for a higher-layer control message such as a Random Access Response transmitted on the PDSCH, a set of transmission power control commands for individual UEs of a UE group, transmission power control information, Voice Over Internet Protocol (VoIP) activation information, etc. A plurality of PDCCHs may be transmitted in the control region. A UE may monitor a plurality of PDCCHs. A PDCCH is formed by aggregating one or more consecutive Control Channel Elements (CCEs). A CCE is a logical allocation unit used to provide a PDCCH at a coding rate based on the state of a radio channel. A CCE includes a plurality of RE groups. The number of CCEs necessary for the PDCCH may be changed depending on a size, a coding rate and the like of the DCI. For instance, one of 1, 2, 4 and 8 CCEs (corresponding to PDCCH formats 0, 1, 2, and 3, respectively) can be used for PDCCH transmission. If a DCI size is large and/or if a low coding rate is required due to a poor channel state, a relatively large number of CCEs may be used to transmit a single PDCCH. An eNB determines a PDCCH format in consideration of a size of DCI transmitted to a UE, a cell bandwidth, the number of downlink antenna ports, the amount of PHICH resources, etc. and adds CRC (cyclic redundancy check) to control information. The CRC is masked by an Identifier (ID) known as a Radio Network Temporary Identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a Paging Indicator Identifier (P-RNTI). If the PDCCH carries system information, particularly, a System Information Block (SIB), its CRC may be masked by a system information ID and a System Information RNTI (SI-RNTI). To indicate that the PDCCH carries a Random Access Response in response to a Random Access Preamble transmitted by a UE, its CRC may be masked by a Random Access-RNTI (RA-RNTI).

Figure 4:
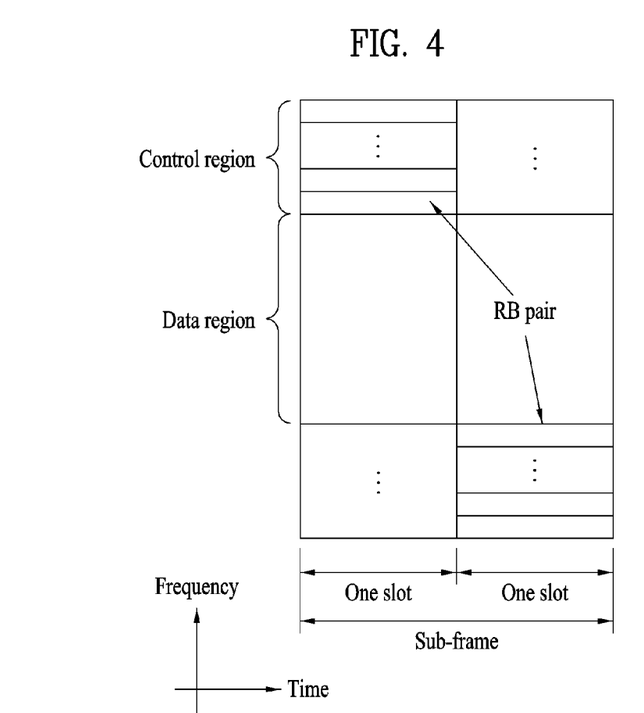
FIG. 4 is a diagram for a structure of an uplink subframe.

FIG. 4 illustrates the structure of an uplink subframe. An uplink subframe may be divided into a control region and a data region in the frequency domain. A Physical Uplink Control CHannel (PUCCH) carrying uplink control information is allocated to the control region and a Physical Uplink Shared Channel (PUSCH) carrying user data is allocated to the data region. To maintain the property of a single carrier, a UE does not transmit a PUSCH and a PUCCH simultaneously. A PUCCH for a UE is allocated to an RB pair in a subframe. The RBs of the RB pair occupy different subcarriers in two slots. Thus it is said that the RB pair allocated to the PUCCH is frequency-hopped over a slot boundary.

Reference Signals (RSs)

In a wireless communication system, a packet is transmitted on a radio channel. In view of the nature of the radio channel, the packet may be distorted during the transmission. To receive the signal successfully, a receiver should compensate for the distortion of the received signal using channel information. Generally, to enable the receiver to acquire the channel information, a transmitter transmits a signal known to both the transmitter and the receiver and the receiver acquires knowledge of channel information based on the distortion of the signal received on the radio channel. This signal is called a pilot signal or an RS.

In the case of data transmission and reception through multiple antennas, knowledge of channel states between Transmission (Tx) antennas and Reception (Rx) antennas is required for successful signal reception. Accordingly, an RS should be transmitted through each Tx antenna.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for an eNB or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE.

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in a situation like handover. The latter is an RS that an eNB transmits along with downlink data in specific resources. A UE can demodulate the data by measuring a channel using the RS. This RS should be transmitted in a data transmission area.

CRSs serve two purposes, that is, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the eNB has two Tx antennas, CRSs for antenna ports 0 and 1 are transmitted. In the case of four Tx antennas, CRSs for antenna ports 0 to 3 are respectively transmitted.

Figure 5:
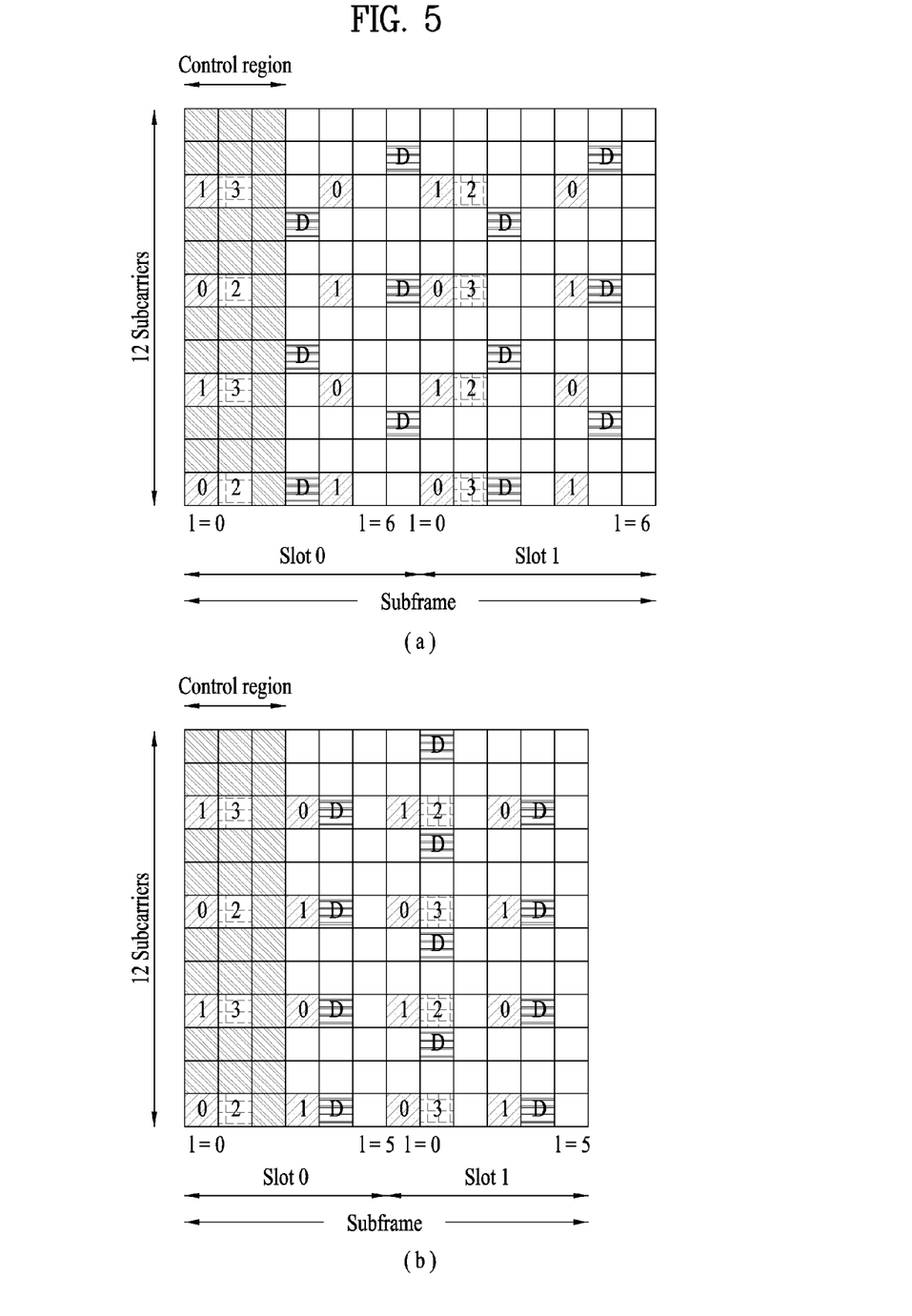
FIG. 5 is a diagram for explaining a reference signal.

FIG. 5 illustrates patterns in which CRSs and DRSs are mapped to a downlink RB pair, as defined in a legacy 3GPP LTE system (e.g. conforming to Release-8). An RS mapping unit, i.e. a downlink RB pair may include one subframe in time by 12 subcarriers in frequency. That is, an RB pair includes 14 OFDM symbols in time in the case of the normal CP (see FIG. 5(*a*)) and 12 OFDM symbols in time in the case of the extended CP (see FIG. 5(*b*)).

In FIG. 5, the positions of RSs in an RB pair for a system where an eNB supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

Figure 6:
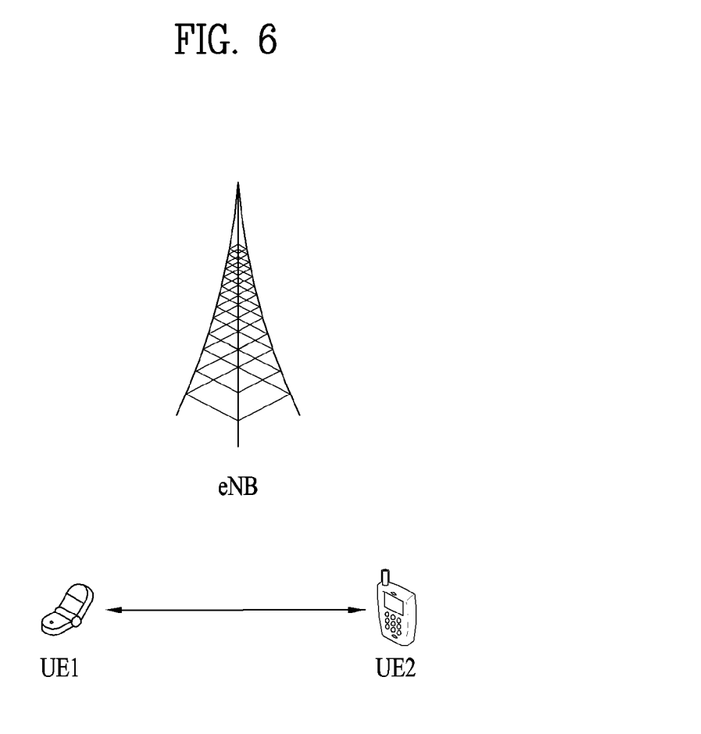
FIGS. 6 to 8 are diagrams to describe a guard period and symbols related to the guard period according to the present invention.

Hereinafter, a method for a UE to perform D2D communication with another UE through a direct radio channel is explained as shown in FIG. 6. Particularly, it relates to a method of transmitting a signal in a subframe including symbols related to a guard period (as a time interval related to switching between WAN (wide area network) communication (i.e., communication between an eNB and a UE) and D2D communication, the guard period will be described hereinafter). In the following description, a subframe used for the purpose of D2D communication can be called a D2D subframe and a subframe used for the purpose of communicating with an eNB can be called a cellular subframe (or a WAN subframe). In addition, a link for D2D communication can be called a D2D link and a link for communication between an eNB and a UE can be called a WAN link.

Symbol Related to Guard Period

A guard period may correspond to a switching time required at a time when switching between WAN communication and D2D communication, i.e., switching between a WAN link and a D2D link occurs. Particularly, for example, if resources used in performing uplink transmission in WAN are used for the purpose of downlink in D2D communication, a UE may need the switching time in order to switch Tx to Rx.

Figure 7:
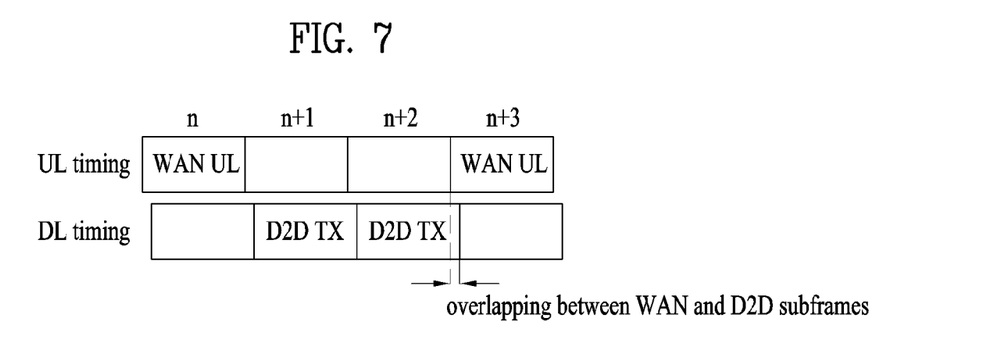

Otherwise, the guard period may be configured due to a difference between transmission timings of WAN and D2D communication systems. Referring to FIG. 7, a UE may transmit uplink signals in subframes n and (n+3) according to UL timing and transmit D2D signals in subframes (n+1) and (n+2) according to DL timing. In the subframe (n+3), the UE should apply TA (timing advance) and then perform transmission. However, in this transmission, the subframe (n+3) may partially overlap with the rear part of the subframe (n+2) in which D2D TX transmission is performed as shown in FIG. 7 and the overlapping time interval may be punctured for WAN signal transmission. Moreover, if D2D signal transmission is performed according to the UL timing, it may overlap with a sounding reference signal transmitted by a different UE performing WAN communication. The overlapping time interval may be punctured in order to protect the sounding reference signal. In this case, the overlapping time interval may correspond to the guard period and the guard period may correspond to a part or all of an OFDM symbol. In this specification, a symbol related to a guard period can be referred to as an OFDM symbol including the aforementioned guard period.

Figure 8:
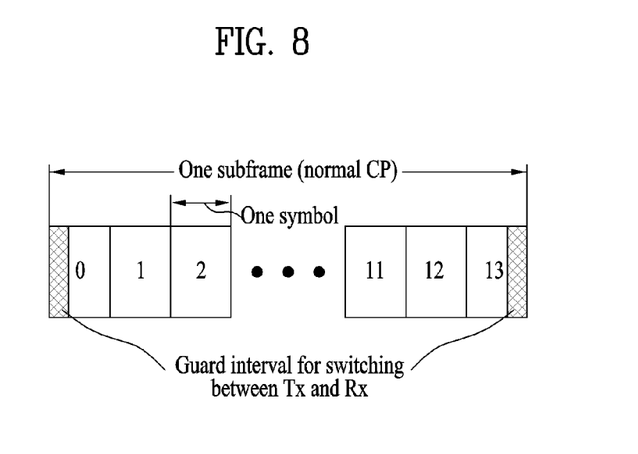

FIG. 8 illustrates an example of a subframe including symbols related to guard periods (intervals). It is assumed in FIG. 8 that a guard period is smaller than one OFDM symbol. OFDM symbols #0 and #13 correspond to the guard period related symbols. If D2D subframes are consecutive, either OFDM symbol #0 or OFDM symbol #13 may correspond to the guard period related symbol. Such a guard period related symbol may exist or not depending on how to use subframes located before and after a specific subframe. For instance, in case that uplink transmission is performed in the subframes before and after the specific subframe, complete transmission can also be performed in the guard period related symbol. However, the guard period is likely to be required for a UE that receives a D2D signal in the specific subframe and performs uplink transmission in the subframes before/after the specific subframe. In particular, if a reception UE does not perform a D2D transmission operation in the subframes before/after the specific subframe, the guard period is not necessary in subframes adjacent to the corresponding subframe, whereby complete reception can be performed even in symbols located at boundaries of the subframe.

The aforementioned guard period related symbol may be punctured for WAN signal transmission or the like as mentioned in the foregoing description. In consideration of this point, signal transmission in the subframe including the guard period related symbol, i.e., a process for the signal transmission may be performed in a different manner as that of the related art. Hereinafter, the process will be described in detail.

Figure 9:
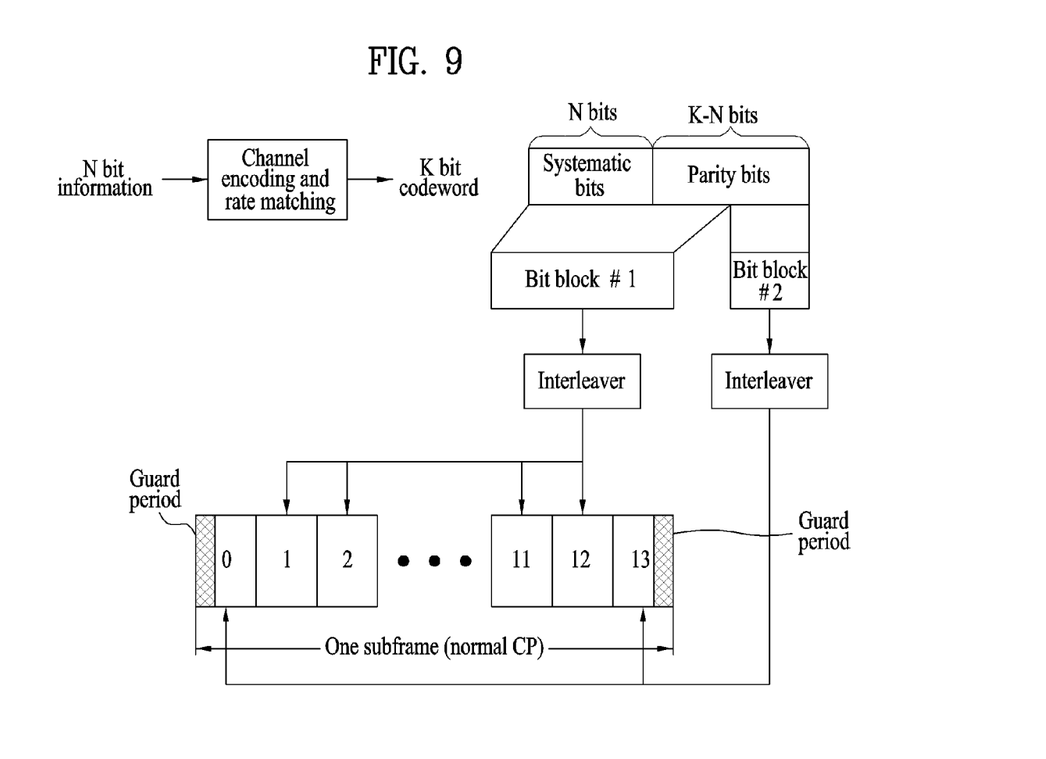
FIGS. 9 and 10 are diagrams to describe a signal transmission method according to the present invention.

Signal Transmission Method for Subframe Including Symbol Related to Guard Period FIG. 9 illustrates a method of generating and transmitting a signal in a subframe including symbols related to guard periods. Referring to FIG. 9, K-bit codeword may be generated from N-bit information through channel encoding and/or rate matching and the generated K-bit codeword may be allocated to a $1^{st}$ (bit) block (i.e., bit block #1) and a $2^{nd}$ (bit) block (i.e., bit block #2). Subsequently, interleaving is performed on each of the $1^{st}$ block and $2^{nd}$ block. And, codewords of the interleaved $1^{st}$ block and $2^{nd}$ block may be transmitted in a manner of being mapped to a plurality of symbols in a subframe. All the above-mentioned steps may not be necessarily performed for the entire process and some of the steps can be omitted. For example, in interleaving with respect to the $1^{st}$ and $2^{nd}$ blocks, interleaving with respect to the $2^{nd}$ block may not be performed. In addition, although FIG. 9 illustrates that the guard period related symbols are located at the both ends of the subframe, it is merely an example and the number, locations and the like of the guard period related symbols can be changed according to size and/or presence of the guard period as mentioned in the foregoing description.

In the above-mentioned process, particularly, when the K-bit codeword is allocated to the $1^{st}$ and $2^{nd}$ blocks, systematic bits and parity bits may be allocated to the $1^{st}$ block and only the parity bits may be allocated to the $2^{nd}$ block. Moreover, a codeword corresponding to the $1^{st}$ block may be mapped/transmitted to/in symbols except the guard period related symbols and a codeword corresponding the $2^{nd}$ block may be mapped/transmitted to/in only the guard period related symbols. In other words, mapping of the codeword allocated to the $1^{st}$ block to the guard period related symbols can be prohibited.

If the systematic bits are mapped to the guard period related symbols, and more particularly, if the guard period related symbols are punctured, decoding performance may be significantly degraded. In this case, if the parity bits are mapped to only the guard period related symbols in a manner of segregating the parity bits as separate blocks as mentioned in the foregoing description, the decoding performance degradation can be avoided.

The size of the $1^{st}$ block can be greater than the systematic bits of the K bits. And, the size of the 2" block can be determined according to the number of the guard period related symbols among a plurality of the aforementioned symbols. For instance, the size of the $2^{nd}$ block can be represented by Formula 1 below.

$$K \times \frac{N_{symb}^{GP}}{2N_{symb}}$$ [Formula 1]

In Formula 1, K is a bit number of the codeword, $N_{symb}^{GP}$ is the number of the guard period related symbols, and $N_{symb}$ is the number of symbols in each slot. In particular, the size of the $2^{nd}$ block may be configured so that the size of the $2^{nd}$ block corresponds to the guard period related symbols in the subframe.

As another example, the size of the $2^{nd}$ block can be determined according to frequency resources (e.g., the number of PRB pairs) allocated for D2D communication as well as the number of the guard period related symbols in the subframe. As a particular example, as shown in FIG. 9, if there are two guard period related symbols and 6 RBs allocated for D2D communication and if BPSK is used, parity bits corresponding to 144 modulation symbols can be included in the $2^{nd}$ block. In this case, if QPSK is used instead of the BPSK, parity bit corresponding to 288 modulation symbols can be included in the $2^{nd}$ block.

Figure 10:
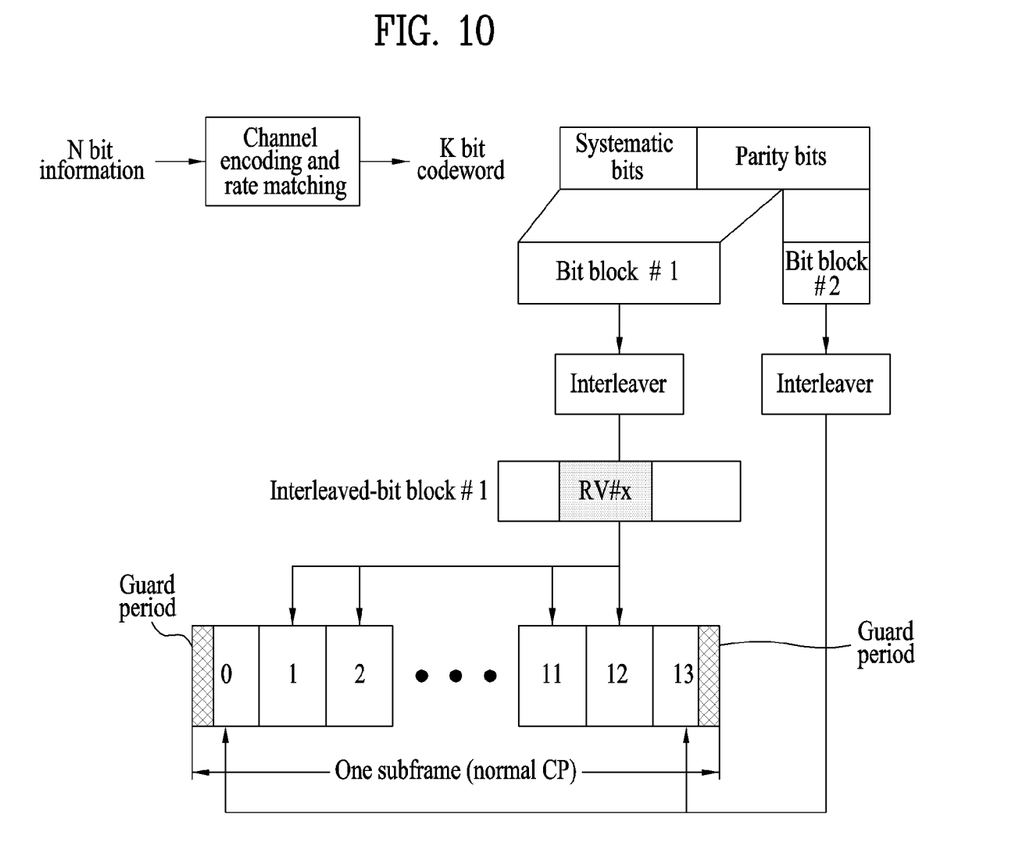

FIG. 10 illustrates a case of performing IR (incremental redundancy) scheme of soft combining. Referring to FIG. 10, a redundancy version can be designated only for a $1^{st}$ block including systematic bits. In particular, the redundancy version can be designated only if transmission is performed through a $2^{nd}$ block including only parity bits or guard period related symbols. In other words, the $2^{nd}$ block or bits corresponding to the $2^{nd}$ block may be excluded from retransmission.

After receiving a signal transmitted according to the above-described scheme, a UE divides the signal into the guard period related symbols and other symbols and then perform de-interleaving. Thereafter, the UE may perform a decoding process by combining respective divisions. In case of an exclusively existing D2D subframe (e.g., a case that more than a prescribed number of neighboring subframes are not assigned for D2D communication), the UE is able to assume that first and last OFDM symbols are the guard period related symbols. Alternatively, the UE is able to assume that first and/or last OFDM symbols of a subframe initially used for D2D communication or a subframe lastly used for D2D communication are the guard period related symbols. On the other hand, information on the number of the guard period related symbols and each number can be directly signaled to a D2D reception UE from a base station or a D2D transmission UE. Moreover, it can be also signaled that guard period related symbols of a specific subframe (or a subframe set) can be punctured and the above-described signal transmission method (or an interleaving scheme) is applied to the specific subframe. In regard to the above signaling, both of the D2D reception UE and the D2D transmission UE corresponds to an in-network UE, the signaling can be performed by a network. Alternatively, in order to reduce the complexity, the above-mentioned signal transmission method (or interleaving scheme) can be applied to all subframes used for D2D transmission/reception.

Device Configuration According to Embodiment of the Present Invention

Figure 11:
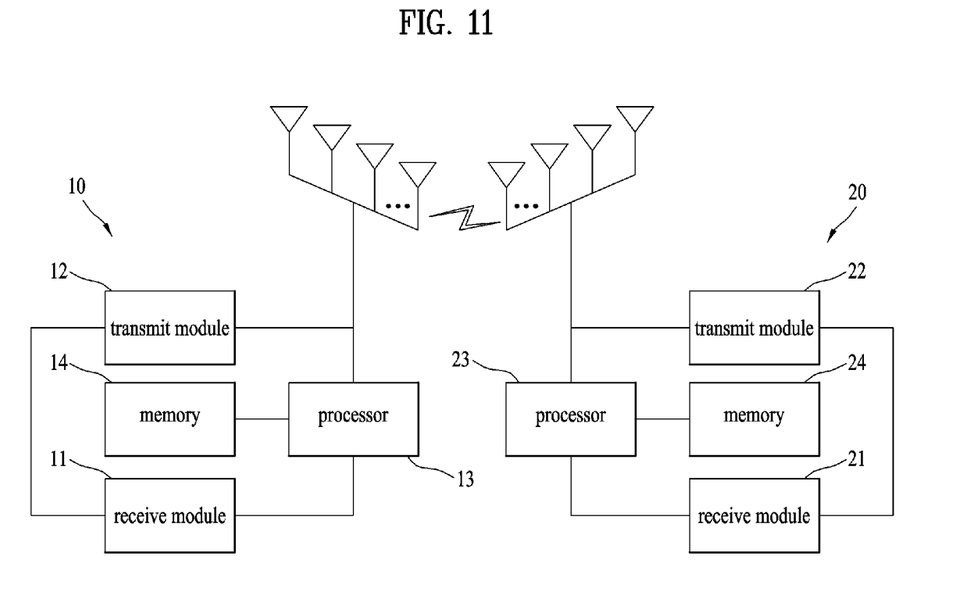
FIG. 11 is a block diagram of a configuration of transmitting and receiving devices.

FIG. 11 is a diagram for configuration of a transmit point apparatus and a user equipment according to embodiment of the present invention.

Referring to FIG. 11, a transmit point apparatus 10 may include a receive module 11, a transmit module 12, a processor 13, a memory 14, and a plurality of antennas 15. The antennas 15 represent the transmit point apparatus that supports MIMO transmission and reception. The receive module 11 may receive various signals, data and information from a UE on an uplink. The transmit module 12 may transmit various signals, data and information to a UE on a downlink. The processor 13 may control overall operation of the transmit point apparatus 10.

The processor 13 of the transmit point apparatus 10 according to one embodiment of the present invention may perform processes necessary for the embodiments described above.

Additionally, the processor 13 of the transmit point apparatus 10 may function to operationally process information received by the transmit point apparatus 10 or information to be transmitted from the transmit point apparatus 10, and the memory 14, which may be replaced with an element such as a buffer (not shown), may store the processed information for a predetermined time.

Referring to FIG. 11, a UE 20 may include a receive module 21, a transmit module 22, a processor 23, a memory 24, and a plurality of antennas 25. The antennas 25 represent the UE that supports MIMO transmission and reception. The receive module 21 may receive various signals, data and information from an eNB on a downlink. The transmit module 22 may transmit various signals, data and information to an eNB on an uplink. The processor 23 may control overall operation of the UE 20.

The processor 23 of the UE 20 according to one embodiment of the present invention may perform processes necessary for the embodiments described above.

Additionally, the processor 23 of the UE 20 may function to operationally process information received by the UE 20 or information to be transmitted from the UE 20, and the memory 24, which may be replaced with an element such as a buffer (not shown), may store the processed information for a predetermined time.

The configurations of the transmit point apparatus and the UE as described above may be implemented such that the above-described embodiments can be independently applied or two or more thereof can be simultaneously applied, and description of redundant parts is omitted for clarity.

Description of the transmit point apparatus 10 in FIG. 11 may be equally applied to a relay as a downlink transmitter or an uplink receiver, and description of the UE 20 may be equally applied to a relay as a downlink receiver or an uplink transmitter.

The embodiments of the present invention may be implemented through various means, for example, hardware, firmware, software, or a combination thereof.

When implemented as hardware, a method according to embodiments of the present invention may be embodied as one or more application specific integrated circuits (ASICs), one or more digital signal processors (DSPs), one or more digital signal processing devices (DSPDs), one or more programmable logic devices (PLDs), one or more field programmable gate arrays (FPGAs), a processor, a controller, a microcontroller, a microprocessor, etc.

When implemented as firmware or software, a method according to embodiments of the present invention may be embodied as a module, a procedure, or a function that performs the functions or operations described above. Software code may be stored in a memory unit and executed by a processor. The memory unit is located at the interior or exterior of the processor and may transmit and receive data to and from the processor via various known means.

Preferred embodiments of the present invention have been described in detail above to allow those skilled in the art to implement and practice the present invention. Although the preferred embodiments of the present invention have been described above, those skilled in the art will appreciate that various modifications and variations can be made in the present invention without departing from the spirit or scope of the invention. For example, those skilled in the art may use a combination of elements set forth in the above-described embodiments. Thus, the present invention is not intended to be limited to the embodiments described herein, but is intended to accord with the widest scope corresponding to the principles and novel features disclosed herein.

The present invention may be carried out in other specific ways than those set forth herein without departing from the spirit and essential characteristics of the present invention.

Therefore, the above embodiments should be construed in all aspects as illustrative and not restrictive. The scope of the invention should be determined by the appended claims and their legal equivalents, and all changes coming within the meaning and equivalency range of the appended claims are intended to be embraced therein. The present invention is not intended to be limited to the embodiments described herein, but is intended to accord with the widest scope consistent with the principles and novel features disclosed herein. In addition, claims that are not explicitly cited in each other in the appended claims may be presented in combination as an embodiment of the present invention or included as a new claim by subsequent amendment after the application is filed.

INDUSTRIAL APPLICABILITY

Embodiments of the present invention are applicable to various mobile communication systems.

What is claimed is:

1. A method of transmitting a D2D (device-to-device) signal, which is transmitted by a user equipment in a wireless communication system, the method comprising:
   generating K bits of a codeword from N bits of information;
   allocating the K bits of the codeword to a $1^{st}$ block and a $2^{nd}$ block;
   performing interleaving on each of the $1^{st}$ block and the $2^{nd}$ block; and
   mapping codewords of the $1^{st}$ block and the $2^{nd}$ block on which the interleaving is performed to a plurality of symbols in a subframe, and transmitting the mapped codewords,
   wherein a size of the $2^{nd}$ block is determined according to the number of symbols related to a guard period among the plurality of the symbols, and
   wherein the size of the $2^{nd}$ block is $$K \times \frac{N_{symb}^{GP}}{2N_{symb}},$$

where K is a bit number of the codeword, $N_{symb}^{GP}$ is the number of the symbols related to the guard period, and $N_{symb}$ is the number of symbols in each slot.

2. The method of claim 1, wherein the $2^{nd}$ block comprises only parity bits among the K bits.

3. The method of claim 1, wherein a mapping of a codeword allocated to the $1^{st}$ block to the symbols related to the guard period is prohibited.

4. The method of claim 1, wherein a size of the $1^{st}$ block is greater than systematic bits among the K bits.

5. The method of claim 1, wherein the guard period relates to switching between WAN (wide area network) communication and D2D communication.

6. The method of claim 1, wherein the guard period relates to sounding reference signal transmission from another user equipment adjacent to the user equipment.

7. A user equipment for transmitting a D2D (device-to-device) signal in a wireless communication system, the user equipment comprising:
   a transmit module; and
   a processor,
   wherein the processor is configured to:
     generate K bits of a codeword from N bits of information, allocate the K bits of the codeword to a $1^{st}$ block and a $2^{nd}$ block, perform interleaving on each of the $1^{st}$ block and the $2^{nd}$ block, map codewords of the $1^{st}$ block and the $2^{nd}$ block on which the interleaving is performed to a plurality of symbols in a subframe, and control the transmit module to transmit the mapped codewords, wherein a size of the $2^{nd}$ block is determined according to the number of symbols related to a guard period among the plurality of symbols, and wherein the size of the $2^{nd}$ block is $$K \times \frac{N_{symb}^{GP}}{2N_{symb}},$$

where K is a bit number of the codeword, $N_{symb}^{GP}$ is the number of the symbols related to the guard period, and $N_{symb}$ is the number of symbols in each slot.

8. The user equipment of claim 7, wherein the $2^{nd}$ block comprises only parity bits among the K bits.

9. The user equipment of claim 7, wherein mapping of a codeword allocated to the $1^{st}$ block to the symbols related to the guard period is prohibited.

10. The user equipment of claim 7, wherein a size of the $1^{St}$ block is greater than systematic bits among the K bits.

11. The user equipment of claim 7, wherein the guard period relates to switching between WAN (wide area network) communication and D2D communication.

12. The user equipment of claim 7, wherein the guard period relates to sounding reference signal transmission from another user equipment adjacent to the user equipment.

* * * * *